Patented Oct. 13, 1942

2,298,612

UNITED STATES PATENT OFFICE 2,298,612

METHOD FOR PRODUCING ASPHALT EMULSIONS

Donald E. Carr, Los Angeles, Calif., assignor to Union Oil Company of California, Los Angeles, Calif., a corporation of California No Drawing. Application June 16, 1939, Serial No. 279,489

4 Claims. (Cl. 252—311.5)

The present invention relates to improved aqueous emulsions of bituminous substances such as bitumen, asphalt and the like. The invention relates particularly to the production of asphalt emulsions having low viscosities.

It is generally known that bituminous emulsions are suitably employed as binders, adhesives and coating compositions and are particularly employed in road building by the cold laying process as, for example, the so-called penetration and mixing methods. When roads are built by the so-called penetration method, the emulsion is sprayed, poured or pumped on the surface of the aggregate which has been evenly distributed on the road bed. For this purpose, emulsions which break rapidly when applied to the aggregate have been used. When roads are built by the mixing method, the emulsion is either premixed with the aggregate and the mixture is applied to the road bed or the emulsion may be applied to the aggregate on the road bed and mixed therewith by being worked across the road bed by means of a blade until the emulsion coats each particle of aggregate. This is followed by tamping and rolling operations. For this purpose, slow breaking emulsions or emulsions which break slowly when applied to the aggregate are used.

Generally, bituminous emulsions have heretofore been produced by topping an asphalt-containing crude oil to remove the lighter hydrocarbon fractions such as gasoline, kerosene, gas oil and light lubricating oils to produce an asphalt residuum of the proper melting point and penetration. This residuum, while in a melted state, is then mixed with an aqueous solution containing an emulsifying agent such as soap or caustic alkali and the mixture is agitated at an elevated temperature until an emulsion of the oil-in-water type is produced. In some cases, if the emulsion is properly prepared employing the correct amount of emulsifying agents, the emulsion may be of the quick breaking type; in other cases, the emulsion prepared may be of the slow-breaking type. If desired, the quick-breaking emulsions may be converted into those of the slow-breaking type by adding to these a small amount of soap, casein or other stabilizing agent.

Whether quick-breaking or slow-breaking, it is a desirable characteristic of a bituminous emulsion for road laying purposes that it have the property to spread evenly when applied to the aggregate. It is also desirable that the emulsion wet and coat the aggregate properly and permit the asphalt particles to coalesce readily. Low viscosity emulsions possess these desirable characteristics of spreading evenly upon the aggregate, coating and wetting each particle of aggregate and coalescing properly, but with high viscosity emulsions such as those having a buttery consistency, it is impossible to obtain an even distribution of the asphalt particles in the aggregate.

Some of the emulsions heretofore produced have sufficiently low viscosities and these are suitable for spreading evenly on the aggregate. This is particularly true with emulsions containing less than 50% water and/or when the emulsions are produced from asphalt residues obtained from choice crudes. Asphalts produced from crude oils obtained from certain oil fields, as, for example, Poso Creek, seem particularly suitable for consistently producing emulsions of satisfactory viscosities. On the other hand, asphalts produced from crude oils obtained from certain other fields, such as McKittrick, rarely, if ever, produce emulsions of satisfactory viscosities. In fact, some of these asphalts are either incapable of emulsification or the emulsions produced therefrom are of the inverted type, i. e. water-in-oil type emulsions. Also, even with asphalts produced from desirable crude oils obtained from selected fields, difficulty has been experienced from time to time in obtaining uniformly good emulsions of reproducible properties even when using crude oil from substantially the same source.

I have discovered that one of the chief reasons for this lack of reproducibility is the occurrence of varying amounts of water and natural electrolytes in the crude oil. Crude oil from different wells commonly differ to a great extent in "cut," i. e. water content. The water content carries dissolved in it the various electrolytes such as sodium chloride, calcium chloride, magnesium chloride, etc. These crudes are generally dehydrated by mechanical, chemical or electrical methods to remove most of the water content. However, a certain amount of water remains with the crude which is later separated from the crude by distillation in the topping of the crude. Since the various electrolytes or salts do not distill with the water, these remain with the asphalt residuum. Hence, if the original water-containing crudes contained varying amounts of the electrolytes, these will remain with the residues in the same proportion as they occurred in the crude provided the crudes were dehydrated to the same extent prior to the distillation step. Thus, the residues produced from the crudes will differ in salt content from one batch to another. However, crude oils as recovered from the wells are not generally dehydrated to the same extent in all cases. The extent of dehydration depends principally upon its characteristics, i. e. its viscosity after dehydration. Hence, a crude which has a low viscosity, such as one containing a large amount of light oil fractions may be dehydrated to a greater extent than one which has a high viscosity. In the latter case, a larger amount of water is retained in the crude in order to permit it to flow and be readily pumped. Therefore, the residue produced by topping the latter crude will contain a greater amount of salt than the residue produced from the crude which had been dehydrated to a lower water content. It is believed that it is this difference in salt content in the asphalt which is to be subjected to emulsification which is responsible for the lack of reproducibility of emulsions and for obtaining high viscosity emulsions, inverted emulsions and in some cases, no emulsions at all.

I have discovered that asphalt emulsions of reproducible properties and having uniformly low viscosities may be produced by subjecting either the crude oil or the asphalt residuum produced from the crude oil to a desalting operation prior to subjecting the asphalt residuum to emulsification with an aqueous solution containing an emulsifying agent. Desalting operations for the purpose of removing water soluble salts from crude oils are well known in the industry and have been carried out for the purpose of minimizing corrosion of refinery equipment in topping installations, particularly in the heat interchangers, crude still tubes, fractionating towers and condensing equipment. It has been thought that the reason for the high corrosiveness of salty crudes lies in the hydrolysis of the calcium and magnesium salts to form hydrochloric acid and this acid is, in part, responsible for the high corrosion difficulties. However, the degree of desalting of such salty crudes in order to prevent corrosion of refinery equipment has not been carried out to such an extent as to result in the production of uniformly reproducible emulsions from the asphalt residues. In other words, a crude oil which has been sufficiently desalted as to prevent excessive corrosion of refinery equipment may not be sufficiently desalted as to produce an asphalt that may be emulsified to produce a good emulsion. I have found that in order to produce uniformly good emulsions, it is necessary to reduce the water soluble salt content of the crude oil to such an extent that the asphalt residuum produced therefrom and which is to be emulsified should contain not appreciably more than 0.0005 to 0.005 per cent by weight of salt depending upon whether the water soluble salt is the salt of a monovalent or divalent metal. On the other hand, I have found that the water insoluble salts present in the asphalt do not have a deleterious effect in the production of the emulsion. For example, I subjected an asphalt residuum having an ash content of about 0.05% to emulsification with an aqueous solution containing an emulsifying agent. This asphalt did not emulsify satisfactorily. When the asphalt was desalted by washing with water to an ash content of 0.02%, it was found that the asphalt emulsified readily to produce a satisfactory emulsion. Yet if the remaining ash content present in the asphalt subsequent to the desalting operation were calcium chloride or another water soluble salt, it would have still been difficult to make a satisfactory emulsion from the desalted asphalt. This conclusion is based upon experiments performed by adding extremely small amounts of calcium chloride to satisfactory emulsions. It was found that as little as twenty parts of calcium chloride per million parts of emulsion containing 55% by weight asphalt made the emulsion too viscous to test by ordinary means, while even five parts of calcium chloride per million parts of emulsion gave a viscosity too high for efficient utilization of the emulsion. Twenty parts per million of calcium chloride corresponds to about 0.0036% by weight based on the asphalt. Consequently, it is believed that the active constituent of the ash which was responsible for producing an unsatisfactory emulsion was removed by the washing operation and that the remaining ash is iron oxide or some other water-insoluble material which is not deleterious to the production of good emulsions.

It is therefore an object of my invention to reduce the soluble salt content of an asphalt so that it contains less than the chemical equivalent of approximately 0.005% of calcium chloride and then emulsifying the thus treated asphalt with an aqueous solution containing an emulsifying agent. 0.005% calcium chloride or 9 parts per million of calcium chloride in asphalt is equivalent to 5 parts per million in asphaltic emulsions containing 55% asphalt.

A further object of my invention resides in desalting an asphalt-base crude oil to such extent that when the desalted crude oil is topped to produce an asphalt which is to be emulsified, the water soluble salt content remaining in the asphalt will be less than approximately 0.005% of a salt of a monovalent metal or 0.0005% of a salt of a divalent metal.

Various other objects, features and advantages of my invention will be apparent to those skilled in the art from the following description of the invention.

As stated heretofore, methods for desalting crude oils are well known. These methods may be used in my process for producing desalted asphalts which emulsify satisfactorily. One of these methods is the so-called electrical method commonly employed for dehydrating crudes. In this method, water is added to the crude oil and is thoroughly mixed therewith to dissolve the salt which results in the formation of an emulsion. The emulsion is then subjected to an alternating current of high potential in order to cause the emulsion to break and the aqueous particles to coalesce. The thus treated mixture is allowed to settle in order to cause the aqueous solution containing the dissolved salt to separate from the oil.

Another method for desalting crude oils involves the addition of demulsifying chemicals to the crude to which has been added fresh water to dissolve the soluble salt content. The method, however, which I prefer to employ involves the application of heat, pressure and addition of fresh water. In this method, the asphalt or crude oil is placed in a heated still provided with an outlet line connected to the discharge side of the pump so that the contents in the still may be circulated to and from the still by means of a pump. Water is added to the heated asphalt or crude oil and the mixture is circulated from and to the still until the water has been thoroughly mixed with the asphalt. During this circulation, the temperature of the contents in the still is gradually increased to about 300 to 400° F. while maintaining a pressure of about 100 to 300 lbs. per square inch. After sufficient circulation to ensure solution of the salt contained in the crude oil or asphalt in the water, the mixture is cooled and allowed to settle in order to effect separation of the oil or asphalt from the solution of water and salt. This washing procedure may, if desired, be repeated several times using fresh water. Water containing a low content of electrolytes is preferably employed, such as refinery boiler "drips" water or any other type of distilled water. The separated oil or asphalt is then dehydrated by distillation at relatively low temperature. If the stock which has been desalted and dehydrated is a crude oil, it is then subjected to the usual topping operation in order to remove gasoline, kerosene, gas-oil and light lubricating oils to produce the asphalt which is desired to be emulsified. If desired, this asphalt may be further desalted as above in order to lower the salt content still further. This may be desirable in cases where it is difficult to reduce the salt content of the crude oil to such an extent that when the desalted crude oil is topped, the amount of salt remaining with the asphalt is below the limit necessary to produce good emulsions. Thus, I may subject the crude oil to a desalting operation before topping and subsequently desalt the asphalt residuum subsequent to topping before it is emulsified.

The desalted asphalt thus produced may then be emulsified by any of the heretofore known methods. For example, the asphalt may be heated in a still to a temperature above its melting point, for example, 320° F. after which the melted asphalt may be passed through a mixing device comprising a centrifugal pump by means of which an aqueous solution of sodium hydroxide only containing an amount of sodium hydroxide to give about 0.12 to 0.14% by weight on the finished emulsion is intimately mixed with the melted asphalt. Agitation by circulating the emulsion through the mixing device is preferably continued until the asphalt is finely dispersed in the caustic soda solution.

Instead of sodium hydroxide as the emulsifying agent for the melted asphalt to produce the emulsion, I may employ other alkaline materials such as potassium hydroxide, or sodium or potassium carbonate and the like, or I may emulsify the asphalt with a soap solution containing such soaps as the oleates, resinates, stearates, palmitates of sodium or potassium. When using soaps as emulsifying agents, I may add the saponifiable constituent used in preparing the soap such as the oleic acid, rosin or rosin oil etc. to the asphalt and then emulsify the mixture with a dilute aqueous solution of the caustic alkali only. Some of the emulsions formed with the foregoing emulsifying agents may be of the quick breaking type depending upon the conditions of emulsification and the quantity of emulsifying agent; others may be of the slow breaking type. In the event it is desired to change the quick breaking emulsions into slow or slower breaking emulsions, small amounts, i. e. 0.5 to 2% of stabilizing agents such as casein, blood albumen, starch, gum acacia, etc. may be added to these emulsions preferably when the emulsions have been cooled to a temperature below 100° F.

The following is a specific example of a method of carrying out my invention:

An asphalt obtained by the distillation of Poso Creek crude oil and having a melting point of 119° F., a penetration of 49 at 77° F., a flash point of 605° F., a sulfur content of 1%, a solubility in 82° naphtha of 94%, an ash content of 0.05 and approximately 0.02% of water soluble salts was charged into a heated still provided with a pump for circulating and agitating the contents in the still. The asphalt was heated to a temperature of about 180° F., after which distilled water was added to the heated asphalt in the ratio of 3 volumes of water to one volume of the asphalt. The mixture was circulated through the pump about five times while gradually increasing the temperature to about 333° F. and pressure to about 110 pounds per square inch. The mixture of asphalt and water was then cooled to about 250° F. and allowed to settle for about thirty minutes. The lower layer of water which stratified from the mixture and containing dissolved salts was separated from the upper layer of asphalt. A portion of this asphalt was removed from the bulk of the asphalt in the still and was dehydrated at 300° F. It was then tested for soluble salts contained therein. It was found that the water soluble salt content of the asphalt had been reduced so that the asphalt contained about 0.0002% salt by weight. The ash content of this sample was 0.03% by weight.

A portion of this asphalt was then emulsified by agitating 60% of it by weight at a temperature of about 300° F. with about 40% by weight of water containing 0.12% by weight rosin oil and 0.24% by weight sodium hydroxide based on the asphalt. The emulsification was effected at 160° F. A test on the viscosity of the emulsion showed a Furol viscosity of 53 seconds at 77° F. which indicates a satisfactory emulsion.

The remaining asphalt in the still was then re-extracted with three volumes of water as in the first extraction. After dehydration at 300° F., a test on the twice extracted asphalt showed that the water soluble salt content in this asphalt had been reduced to about 0.00015%. The ash content of this asphalt was approximately 0.03%.

This asphalt was then emulsified as above, employing the same amount of rosin oil and sodium hydroxide. The viscosity of the thus produced emulsion was 35 seconds Furol at 77° F. which is a satisfactory emulsion.

In order to show a comparison of the emulsifying behavior of the foregoing extracted asphalts with the original unextracted asphalt containing about 0.02% water soluble salts, the latter was subjected to emulsification in the same manner as above, using the same amount of rosin oil and sodium hydroxide. The emulsification, however, did not proceed as smoothly as in the two previous emulsions and the emulsion which was produced was too heavy to obtain a Furol viscosity at 77° F. Such an emulsion is not considered by the industry to be an acceptable emulsion for road building or any purpose. The color of the emulsion was very poor, being very dark brown, while the colors on the two previous emulsions were good, being a very light brown.

It will be understood that the foregoing description of my invention is not to be taken as limiting since many variations may be made by those skilled in the art without departing from the spirit of my invention, which I claim to be:

1. A method for producing a bituminous emulsion of low viscosity which comprises separating salt contained in asphalt to produce an asphalt containing less than approximately 0.0005% by weight of a water soluble inorganic salt of a divalent metal and less than approximately 0.005% by weight of a water soluble salt of a monovalent metal and subsequently mixing said asphalt at an elevated temperature with water and an emulsifying agent.

2. A method as in claim 1 in which the salt is removed from said asphalt by mixing said asphalt at an elevated temperature with a sufficient amount of water to dissolve salt contained in said asphalt, permitting the mixture to settle, removing the aqueous salt solution and dehydrating the asphalt.

3. A method as in claim 1 in which the salt is removed from said asphalt by mixing said asphalt with water at a temperature of 300–400° F., allowing said mixture to settle, separating the aqueous salt solution from the settled asphalt and subsequently dehydrating the asphalt at a temperature of about 300° F.

4. A method for producing bituminous emulsions which comprises mixing asphalt to be emulsified with sufficient water at an elevated temperature to dissolve sufficient salt therefrom to produce an asphalt containing approximately 0.00015 to 0.0002% by weight of water soluble inorganic salt, separating the salt solution from said asphalt, melting said asphalt and subsequently mixing said melted asphalt with water and an emulsifying agent to produce an aqueous bituminous emulsion of relatively low viscosity.

DONALD E. CARR.